(12) United States Patent
Mortensen et al.

(10) Patent No.: US 7,426,385 B2
(45) Date of Patent: Sep. 16, 2008

(54) COMMUNICATION DEVICE AND METHOD FOR COMMUNICATING OVER A DIGITAL MOBILE NETWORK

(75) Inventors: Ivar Mortensen, Stuttgart (DE); Alf Neustadt, Stuttgart (DE)

(73) Assignee: Alcatel, Paris (FR)

( * ) Notice: Subject to any disclaimer, the term of this patent is extended or adjusted under 35 U.S.C. 154(b) by 279 days.

(21) Appl. No.: 10/285,510

(22) Filed: Nov. 1, 2002

(65) Prior Publication Data

US 2003/0096608 A1   May 22, 2003

(30) Foreign Application Priority Data

Nov. 16, 2001   (EP)   .................... 01440390

(51) Int. Cl.
*H04Q 7/20* (2006.01)

(52) U.S. Cl. .................. 455/425; 455/422.1; 455/550.1

(58) Field of Classification Search ................ 455/436, 455/422.1, 445, 466, 336; 375/147, 141; 370/328, 230

See application file for complete search history.

(56) References Cited

U.S. PATENT DOCUMENTS

| | | | |
|---|---|---|---|
| 5,757,772 A | 5/1998 | Thornberg et al. | |
| 6,097,700 A | 8/2000 | Thornberg et al. | |
| 6,167,237 A | 12/2000 | Rapeli | |
| 6,298,081 B1* | 10/2001 | Almgren et al. | 375/132 |
| 6,438,723 B1* | 8/2002 | Kalliojarvi | 714/751 |
| 6,574,767 B2* | 6/2003 | Eroz et al. | 714/755 |
| 6,708,034 B1* | 3/2004 | Sen et al. | 455/445 |
| 7,106,694 B1* | 9/2006 | Salonen et al. | 370/230 |
| 2001/0007578 A1* | 7/2001 | Ran et al. | 375/253 |
| 2001/0008542 A1* | 7/2001 | Wiebke et al. | 375/141 |
| 2001/0021180 A1* | 9/2001 | Lee et al. | 370/336 |
| 2002/0054578 A1* | 5/2002 | Zhang et al. | 370/328 |
| 2002/0082013 A1* | 6/2002 | Lee et al. | 455/436 |
| 2002/0191682 A1* | 12/2002 | Moon | 375/147 |
| 2003/0054843 A1* | 3/2003 | Notani et al. | 455/466 |
| 2004/0015750 A1* | 1/2004 | Obuchi et al. | 714/704 |
| 2004/0082324 A1* | 4/2004 | Ayoub | 455/422.1 |

FOREIGN PATENT DOCUMENTS

| | | |
|---|---|---|
| WO | WO 99/27170 A2 | 2/1999 |
| WO | WO 00/78081 A1 | 12/2000 |
| WO | WO 01/29986 A1 | 4/2001 |

\* cited by examiner

*Primary Examiner*—Vincent P. Harper
*Assistant Examiner*—Phuoc Doan
(74) *Attorney, Agent, or Firm*—Sughrue Mion, PLLC

(57) ABSTRACT

The present invention relates to a digital mobile communication network component comprising means for selecting a first or a second interleaving length, the selection being dependent on network traffic, the means for selecting being adapted to be coupled to means for communication over a digital mobile communication network, such as a UMTS network, the means for communication having interleaving means for data packets.

15 Claims, 2 Drawing Sheets

COMMUNICATION DEVICE AND METHOD FOR COMMUNICATING OVER A DIGITAL MOBILE NETWORK

FIELD OF INVENTION

This invention relates to digital mobile communication networks, such as code division multiple access (CDMA) networks, and more particularly to the universal mobile telephone system (UMTS) and other digital mobile communication networks allowing a change of communication parameters during an ongoing communication session.

BACKGROUND AND PRIOR ART

A variety of overload control mechanism is known from the prior art for application in digital mobile communication networks in cases of congestion. One way of "controlling" the load on the communication network which is utilized in the global system for mobile communications (GSM) consist of rejecting communication requests of a mobile station with a message forbidding the mobile station to access the channel for some specified length of time. This mechanism prevents any further repetitions by the mobile station, either through its automatic repetition scheme or through repeated user requests. This mechanism is used in GSM when over load threatens the overall throughput.

Another approach which is utilized in GSM consists in forbidding a whole population of mobile stations to access the cell through an indication on the broadcast control channel (BCCH). This enables a cut-down in the traffic at the source without incurring any additional traffic toward mobile stations. In order to achieve this, subscribers are split into balanced-sub-populations, through a random allocation controlled by their operator.

The access class to which a given subscriber belongs is stored in the subscriber identity module (SIM) and is therefore available to the mobile station. In normal load situations all classes are allowed access. When traffic must be cut down, the base station controller (BSC) can decide to block one, two or any number of these access classes, reducing statistically the amount of traffic by a corresponding percentage.

As in the GSM system the air-interface is also a shared resource in UMTS. As a consequence the UMTS standard allows certain congestion-control mechanisms in order to take the appropriate actions when congestion is detected. Depending on the degree of congestion the consequences can be very varied. Some possible consequences are:
  lost calls,
  a higher bit error rate (BER) and thus—in the case of voice transmission—bad sound quality,
  service refusal.

One approach for managing a congestion situation which is compliant with the UMTS standard is to decrease the quality of service (QoS) in order to allow more users to be active at the same time. The channel capacity requirement of each ongoing communication session is decreased by allowing an increase of the frame error rote (FER) when congestion is detected and thereby reducing the power with which each user is served—power is the shared resource here.

U.S. Pat. No. 6,167,237 shows a universal wireless communication system comprising at least two wireless subsystems which is operated at the edge of spectral efficiency while at the same time allowing wireless communication stations to operate such that optimal power saving is obtained under acceptable transmission conditions. A radio base station of one of the subsystems measures whether a wireless communication station of another one of the subsystems causes adjacent channel interference in a channel its own subsystem. If so, the radio base station commands the wireless communication station of the other substation to adjust its spectral transmission characteristic such that the transmit spectrum becomes narrower. If no interference is detected the wireless communication station of the other subsystem is allowed to broaden its spectrum so that a less complex transmit signal processing, such as filtering, con be applied and thus power saving is achieved.

U.S. Pat. No. 6,097,700 shows a packet switched radio channel congestion control system for controlling congestion on a packet switched radio channel (PRCH) is disclosed. A PRCH congestion control function determines if the average time delay for packet calls on the PRCH is within a delay alarm level. If the average time delay is not within the delay alarm level, it is then determined which packet calls to expel from the PRCH in order to decrease the average time delay. The determination for congestion may be made for each of the uplink and downlink of a PRCH separately, or, on the combined uplink and downlink of the PRCH. A similar system is known from U.S. Pat. No. 5,757,772.

It is a common disadvantage featured by the above described prior art approaches to handle congestion that the individual user may either experience a temporary discontinuation of the desired communication service or a significant reduction in sound quality and thus intelligibility of a telephone call.

SUMMARY OF THE INVENTION

The invention provides for an improved digital mobile communication network component and an improved computer program and method for handling of a congestion situation in a digital mobile communication network which allows to adapt the transmission characteristics during communication.

The present invention is particularly advantageous in that it enables to handle a congestion situation without service refusal and without deteriorating the sound quality. This is accomplished by increasing the interleaving length in response to the detection of a congestion situation. The interleaving length of a service is dynamically adapted to a certain congestion situation of the communication system.

When a congestion situation occurs the interleaving length is increased and power is reduced in order to make more efficient usage of the available bandwidth. An increase of the interleaving length compensates the reduction of the power such that the bit error rate (BER) remains the same. As a consequence a user does not experience a deterioration of the sound quality and/or intelligibility of a call.

In a preferred embodiment of the invention the standard interleaving length is 10 or 20 ms in a normal network traffic situation. In case of congestion the interleaving length is increased to for example 40 or 80 ms. This results in a corresponding increase of transmission delay experienced by the user. A transmission delay of up to 80 ms is however still acceptable to a user especially in view of the fact, that otherwise the quality of service remains unchanged in comparison to a non-congested network traffic situation.

The concept of encoding and interleaving is as such well known from the prior art with respect to the GSM system and also with respect to CDMA systems. For example in the GSM system there is a fixed interleaving length of 20 ms. The coding length is chosen to be equal to the interleaving length in the GSM system.

In a preferred embodiment of the invention the coding length and/or other communication parameters are changed when the interleaving length is changed. This can be done by means of a corresponding parameter set. In accordance with a preferred embodiment of the invention at least two parameter sets are provided to each mobile phone during communication set up. When a congestion situation occurs the appropriate parameter set is activated in order to increase the interleaving length and change other corresponding communication parameters such as the encoding length correspondingly.

In accordance with a further preferred embodiment of the invention a congestion situation is detected by a UMTS terrestrial radio access network (UTRAN). Such a congestion situation is signaled to the involved mobile phones such that the interleaving lengths are adapted correspondingly.

BRIEF DESCRIPTION OF THE DRAWINGS

In the following the invention is explained in greater detail by making reference to the drawings in which:

FIG. 1 shows a UMTS terrestrial radio access network UTRAN 1. The UTRAN 1 comprises a number of radio network controllers RNC 2. Each of the RNCs has a radio network subsystem (RNS). Further the UTRAN 1 has multiple Node-Bs 3. A Node-B 3 corresponds to a GSM base station while the RNC 2 is equivalent to a GSM base station controller (BSC).

Each RNC 2 provides a radio resource management (RRM) functionality. The RRM encompasses functions like dynamic channel allocations, call admission control, scheduling of data services and other RRM mechanisms.

Each of the Node-Bs 3 is coupled to its RNC 2 for communication and control purposes. In particular each Node-B 3 provides a measurement value to its RNC 2 which indicates the network traffic situation experienced by that Node-B 3. This enables the RNC 2 to detect an increase of network traffic and in particular congestion situations.

Figure 1:
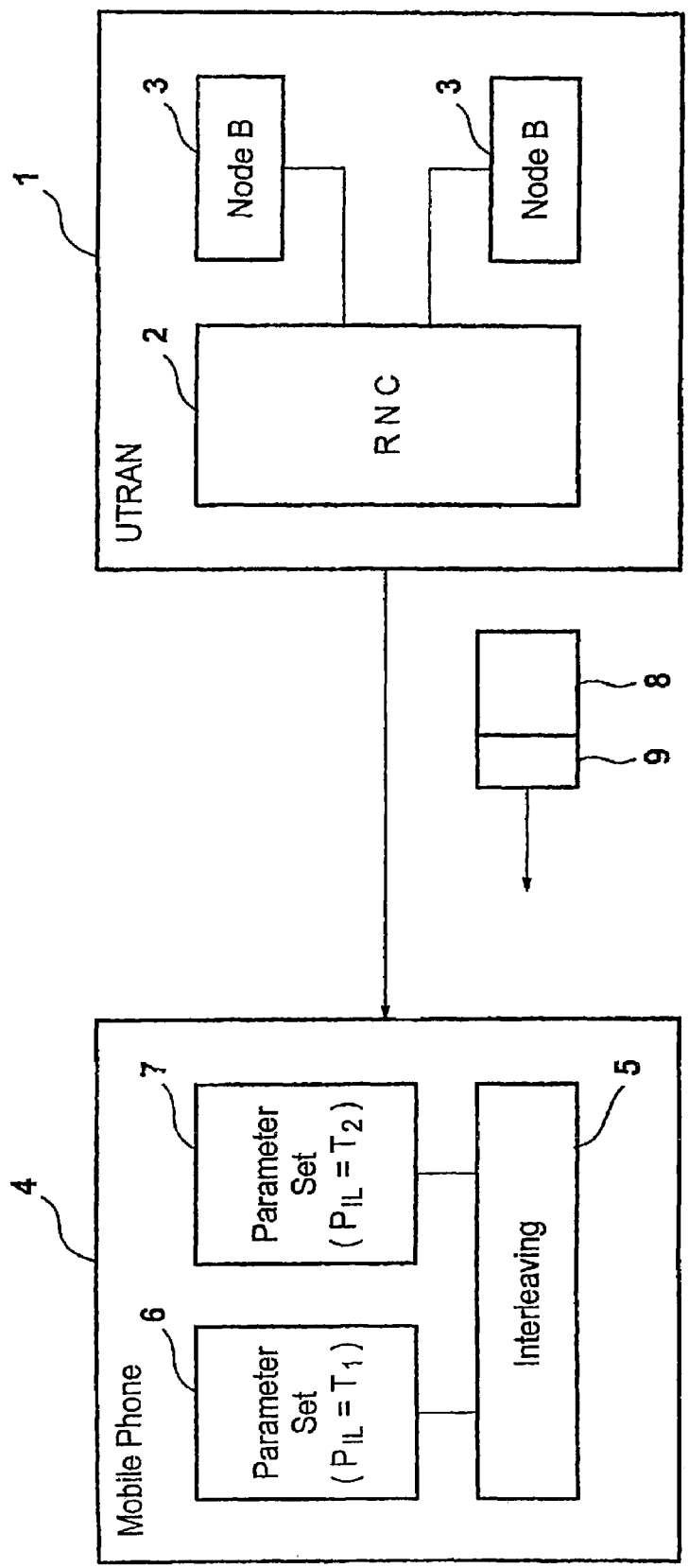
FIG. 1 is a block diagram of an embodiment of a communication system in accordance with the invention.

The communication system of FIG. 1 further comprises a number of mobile phones 4. The mobile phone 4 can be any end-user communication device having an air interface for communication over UTRAN 1. Examples for such end-user communication devices include personal digital assistants, mobile computers, automotive mobile communication devices, web appliances and other. In the example considered with respect to FIG. 1 the mobile phone 4 is compliant with the UMTS standard.

The mobile phone 4 has an interleaving module 5 which performs interleaving in accordance with the UMTS standard. The interleaving module 5 is coupled to registers 6 and 7. The register 6 serves to store a parameter set which is used in a non-congested network traffic situation. In particular this parameter set stored in the registers 6 comprises a parameter $P_{IL}$ to specify the interleaving length. This interleaving length equals $T_1$ for the non-congested network traffic situation.

The register 7 serves for storage of a parameter set for usage in a congested network situation. In this parameter set the parameter $P_{IL}$ has a value of $T_2$, where $T_2 > T_1$.

A congestion situation can occur within a variety of scenarios: One of the scenarios is that congestion occurs during an ongoing communication session involving the user of the mobile phone 4.

In this scenario the congestion situation is detected by the RNC 2 during the ongoing communication session. In response to the detection of the congestion situation the RNC 2 selects an increased interleaving length for data packets 8 to be sent to the mobile phone 4. The data packets 8 have a header 9 which contains a Transport Format Combination Indicator (TFCI). The TFCI is a data field in the header 9 which indicates—among other things—the interleaving length which is used for the data packets 8.

When the data packet 8 is received by the mobile phone 4 the interleaving module 5 selects the parameter set with the increased interleaving length in accordance with the interleaving length specified by the TFCI data field. This way the parameter set which is stored in the register 7 is selected by the interleaving module 5. Other communication parameters can be changed correspondingly, such as coding length and power.

When the congestion situation is over, this is also detected by the RNC 2. In response to the detection of an end of the congestion situation the RNC 2 selects the interleaving length of the non-congested network condition. In the following this interleaving length for the non-congested network condition is utilized for the data packets 8 and indicated in the TFCI data field. The interpretation of this header information by the interleaving module 5 results in the selection of the parameter set stored in the register 6.

In other words, the RNC 2 selects the interleaving length to be utilized for the data packets 8 depending on the network traffic situation. If the network becomes congested a longer interleaving length of $T_2$ is selected whereas in the normal non-congested situation the shorter interleaving length $T_1$ is selected. The selection of the interleaving length is coded into the TFCI data field and communicated this way to the mobile phone 4 for selection of the corresponding parameter set.

It is to be noted, that more than two parameter sets can be utilized in order to allow a finer level of adaptation of the communication parameters utilized by the mobile phone 4 to the actual network traffic conditions. A good choice for the interleaving length $T_1$ is 10 ms or 20 ms for the normal non-congested network situation. For the congested case a good choice for $T_2$ is 40 ms or 80 ms.

It is to be noted that it is not essential to provide one or more alternative parameter sets to the mobile phone 4 each time a communication link is established between a mobile phone 4 and UTRAN 1. In one embodiment only the "standard" parameter set to be stored in register 6 is provided to the mobile phone 4 when the network is in a normal traffic situation.

If a congested network situation is detected the alternative parameter set to be stored in register 7 is transmitted to the mobile phone 4. This has the advantage that the alternative parameter set can be adapted to the specific actual network congestion situation. The disadvantage of this embodiment is however that additional network traffic occurs for transmitting the parameter set in an already congested network. For changing the parameter set during an ongoing communication session the UMTS procedure "synchronized radio link reconfiguration" can be utilized.

In an alternative embodiment of the invention the standard parameter set and one or more alternative parameter sets are provided to the mobile phone 4 each time a communication session is established irrespective of the actual network situation at the time the telephone call is made. This has the advantage that the mobile phone 4 is already initialized to switch into an alternative mode of operation when a congestion situation occurs to make more efficient usage of the available channel capacity. This embodiment has the further advantage that an adaptation can be performed more rapidly and without a need to transmit a parameter set the mobile phone 4 when the network becomes congested.

It is to be noted that the above explained principles of operation are also applicable for other scenarios, such as a hand-over from a non-congested cell to a congested network cell and a phone call from a mobile phone within a congested network cell. In both cases a longer interleaving length is selected in order to make more efficient usage of the available channel capacity.

Figure 2:
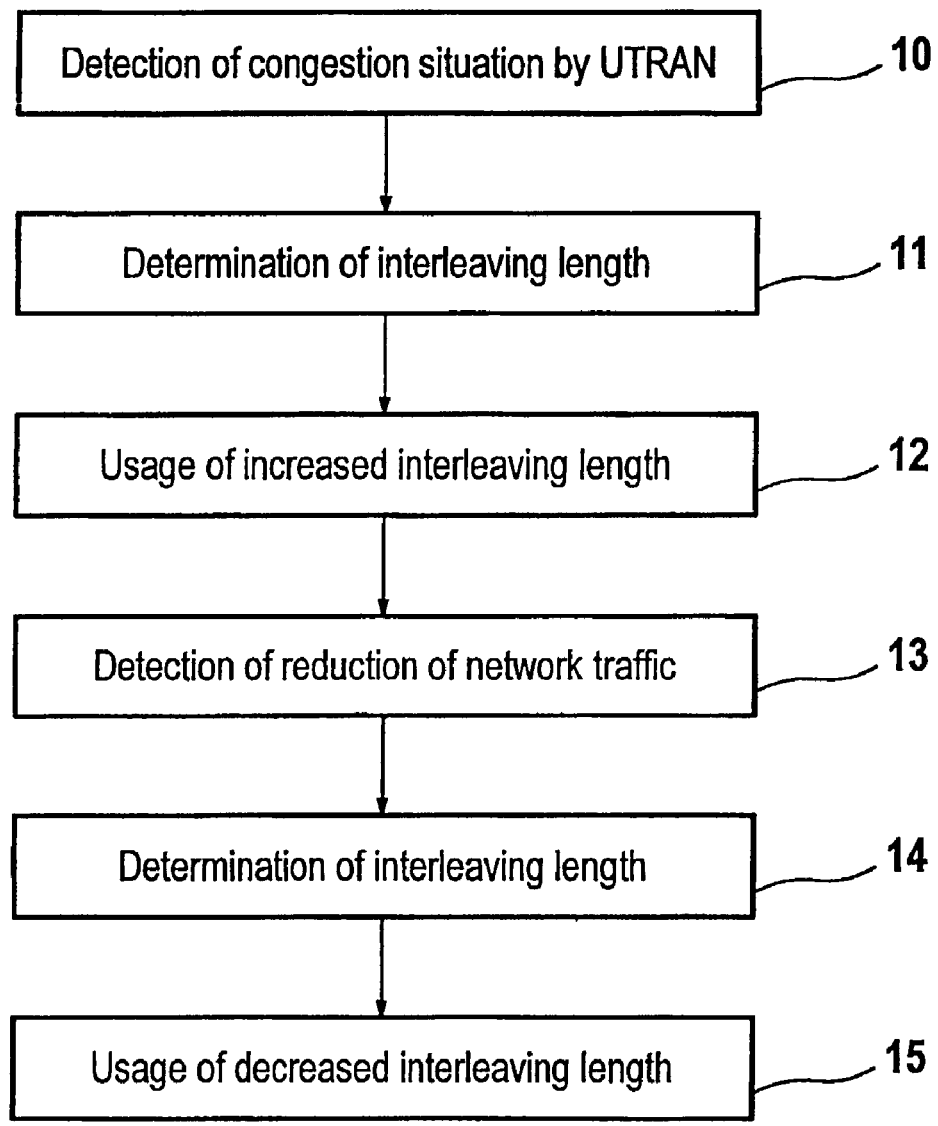
FIG. 2 is illustrative of an embodiment of a method in accordance with the invention.

FIG. 2 is illustrative of a corresponding method. In step 10 the UTRAN detects a congestion situation. Typically this is done by the radio resource management functionalities provided by the radio network control unit of the UTRAN.

In step 11 the appropriate reduced interleaving length in view of the detected congestion situation is determined. In the following the increased interleaving length is utilized for data packets 8 (cf. FIG. 1)—step 12.

At the same time other communication parameters can be adapted correspondingly. This results in a reduction of the network load while the quality of service is maintained for each user. The only change experienced by the users of the mobile phones is a slight increase of the transmission delay which is caused by the increased interleaving length.

In step 13 a significant reduction of network traffic is detected by the UTRAN. In step 14 the UTRAN determines a reduced interleaving length which corresponds to the improved network traffic situation. The decreased interleaving length is used again in step 15.

As an optional feature the mobile phone has output means to signal a change of the interleaving length to the user. This can be done by displaying information indicative of the change on the display of the mobile phone and/or by an acoustic signal generated by the mobile phone.

The invention claimed is:

1. A digital mobile communication network component comprising:
   detection means for detecting a traffic condition of a digital mobile communication network during an ongoing communication session; and
   selection means for selecting a first interleaving length or a second interleaving length during the ongoing communication session, based on the traffic condition which is detected by the detection means,
   the selection means being coupled to means for communication over the digital mobile communication network, the means for communication including means for interleaving data packets in accordance with the first or second interleaving length which is selected by the selection means.

2. The digital mobile communication network component of claim 1, being adapted to communicate with a mobile phone comprising means for storing first and second parameter sets having first and second interleaving length parameters, respectively.

3. The digital mobile communication network component of claim 2 further comprising means for generating control information indicative of the first interleaving interval or the second interleaving interval which is selected by the selection means, the control information being transmitted to the mobile phone via the means for communication.

4. The digital mobile communication network component of claim 1, wherein the first interleaving length is equal to 10 ms or 20 ms and the second interleaving length is equal to 40 ms or 80 ms, the first interleaving length is selected by the selection means in case where the traffic condition is that the digital mobile communication network is not congested and the second interleaving length is selected by the selection means in case where the traffic condition is that the digital mobile communication network is congested.

5. A digital mobile communication network component comprising:
   reception means for receiving information being indicative of network traffic;
   detection means for detecting a traffic condition of a digital mobile communication network during an ongoing communication session based on the information received by the reception means;
   selection means for selection of an interleaving length during the ongoing communication session based on the traffic condition detected by the detection means;
   means for indicating the selection of the interleaving length to an end-user communication device.

6. The digital mobile communication network component of claim 5, wherein the selection means selects a first interleaving length if the traffic condition is that the digital mobile communication network is not congested and a second interleaving length when the network is if the traffic condition is that the digital mobile communication network is congested, the second interleaving length being substantially longer than the first interleaving length.

7. The digital mobile communication network component of claim 5 the means for indicating being adapted to signal a change of a selection of the interleaving length during an ongoing end-user communication device communication session.

8. The digital mobile communication network component of claim 5, the component being an UTRAN component.

9. An end-user communication device comprising:
   receiving means for receiving a control signal from a digital mobile communication network component, the control signal indicating a first interleaving length or a second interleaving length which is selected by the digital mobile communication network component during an ongoing communication session based on a detected traffic condition of a digital communication network during the ongoing communication session; and
   interleaving means for interleaving data packets in accordance with the first or second interleaving length.

10. The end-user communication device of claim 9, further comprising means for indicating a change of a selection of interleaving length to a user.

11. The end-user communication device of claim 9, further comprising means for storing first and second parameter sets having first and second interleaving length parameters, respectively.

12. The end-user communication device of claim 11, wherein the first interleaving length is equal to 10 ms or 20 ms and the second interleaving length is equal to 40 ms or 80 ms, the first interleaving length is selected by the digital mobile communication network component in case where the traffic condition is that the digital mobile communication network is not congested and the second interleaving length is selected by the digital mobile communication network component in case where the traffic condition is that the digital mobile communication network is congested.

13. A method for communicating over a digital mobile communication network, the method comprising:
   monitoring of network traffic of a digital mobile communication network;
   selecting an interleaving length depending on the network traffic; and
   indicating of the interleaving length which is selected to an end-user communication device, wherein the selecting the interleaving length comprises selecting a first interleaving length if the network is not congested traffic condition and a second interleaving length if the network is congested, the second interleaving length being substantially longer than the first interleaving length.

14. A method for communicating over a digital mobile communication network, the method comprising:
   monitoring of network traffic of a digital mobile communication network;
   selecting an interleaving length depending on the network traffic; and
   indicating of the interleaving length which is selected to an end-user communication device,
   wherein the indicating of the interleaving length comprises signaling a change of a selection of the interleaving length during an ongoing end-user communication device communication session.

15. A method for communicating over a digital mobile communication network, the method comprising:
   monitoring of network traffic of a digital mobile communication network;
   selecting an interleaving length depending on the network traffic; and
   indicating of the interleaving length which is selected to an end-user communication device,
   wherein interleaving data packets transmitted by the end-user communication device based on the interleaving length which is selected and indicated.

* * * * *